United States Patent [19]
Reich et al.

[11] 4,043,576
[45] Aug. 23, 1977

[54] THREADED PIPE COUPLING FOR SMOOTH PLASTIC JOINTS

[75] Inventors: Fritz Reich, Uhwiesen; Ernesto Lehmann, Neuhausen, both of Switzerland

[73] Assignee: Georg Fischer Aktiengesellschaft, Switzerland

[21] Appl. No.: 712,768

[22] Filed: Aug. 9, 1976

[30] Foreign Application Priority Data

Aug. 27, 1975 Switzerland .................... 11125/75

[51] Int. Cl.² .......................................... F16L 21/06
[52] U.S. Cl. .................... 285/322; 285/341; 285/342; 285/343; 285/348; 285/354; 285/382.7; 285/386
[58] Field of Search ............... 285/322, 323, 285, 348, 285/354, 386, 342, 382.7, 341, 343, 23

[56] References Cited
U.S. PATENT DOCUMENTS

| | | | |
|---|---|---|---|
| 2,497,273 | 2/1950 | Richardson | 285/342 |
| 3,265,412 | 8/1966 | Reid | 285/348 |
| 3,486,775 | 12/1969 | Callahan | 285/348 |
| 3,857,591 | 12/1974 | Voss | 285/382.7 |

*Primary Examiner*—Reinaldo P. Machado
*Attorney, Agent, or Firm*—Roylance, Abrams, Berdo & Kaul

[57] ABSTRACT

A coupling for smooth pipe includes a housing, a sleeve nut threaded onto the housing, a gasket inside the housing and a thrust and locking ring structure within and between the housing and sleeve nut. The housing has a tapered inner surface to compress the gasket. When the nut is threaded onto the housing, the ring structure is axially moved by a shoulder on the nut to compress the gasket. The nut then radially deforms tongues on the locking ring structure to grip the pipe.

6 Claims, 2 Drawing Figures

4,043,576

THREADED PIPE COUPLING FOR SMOOTH PLASTIC JOINTS

BACKGROUND OF THE INVENTION

The invention relates to pipe couplings and particularly to a threaded coupling for smooth plastic pipes.

In a known threaded coupling of this general type, on screwing down the sleeve nut against the housing for the purpose of tightening the screwed pipe joint, there is an axial displacement of an inner conical surface via the gripping member. As a result, the member, which in this case, is in the form of a loose, axially slit collet, initially undergoes a constriction, so that the pipe end introduced up to the base of the housing member is secured. Another known construction has a gripping member connected in one part with the housing member and an elastomeric gasket is inserted in a slot of the housing so as to project inwardly.

In these constructions, the elastomeric gasket must be somewhat narrower than the external diameter of the pipe and is expanded by the pipe during the insertion of the latter, thereby bringing about a seal. This has the disadvantage that the gasket is easily damaged by the pipe end which is often sharp-edged, or by grooves of the pipe surface and it can even be displaced from its seat in the housing member.

BRIEF SUMMARY OF THE INVENTION

Accordingly, it is an object of the invention to eliminate this shortcoming and provide a perfectly sealing screwed pipe joint which grips the smooth pipe end in tension-proof manner and in which the elastomeric gasket is protected against damage.

A further object is to provide a pipe joint in which positive locking is directed axially against the gasket and exists between the sleeve nut and the locking ring arrangement, when the screwed joint is disengaged and in which, on progressively screwing down the sleeve nut, can be overcome after an axial displacement of the locking ring arrangement with a predetermined axial force in order to permit only subsequently a radial deformation of the gripping member on the conical surface of the sleeve nut.

Yet another object is to provide a coupling or joint in which, at the start of the tightening process, the locking ring arrangement necessarily exerts a predetermined axial force on the gasket, whereby the latter is radially deformed and pressed against the pipe surface, and wherein the gasket can thus be constructed with a larger internal diameter than the pipe external diameter with the screwed joint disengaged and can be located in a protected position behind the locking ring arrangement.

Briefly described, the invention includes a threaded coupling for smooth pipe comprising a housing member for receiving one pipe end; a sleeve nut threadedly engaging said housing, said nut having an inner conical surface, said nut being axially movable relative to said housing upon relative rotation thereof between a disengaged position and a fully engaged position; an elastomeric gasket within said housing; a thrust ring axially adjacent said gasket; and elastically deformable gripping means abutting said conical surface and said thrust ring for gripping said pipe; said sleeve nut and said thrust ring having cooperative surfaces to cause axial movement of said thrusting ring during a first portion of the axial movement of said sleeve nut from said disengaged position toward said engaged position, said axial movement of said thrust ring causing an axial force on said gasket; said cooperative surfaces being disengaged at a predetermined axial force to subsequently permit radial deformation of said gripping means by said conical surface to grip said pipe.

BRIEF DESCRIPTION OF THE DRAWINGS

In order that the manner in which the foregoing and other objects are attained in accordance with the invention can be understood in detail, particularly advantageous embodiments thereof will be described with reference to the accompanying drawings, which form a part of this specification, and wherein.

DETAILED DESCRIPTION OF THE PREFERRED EMBODIMENTS

Figure 1:
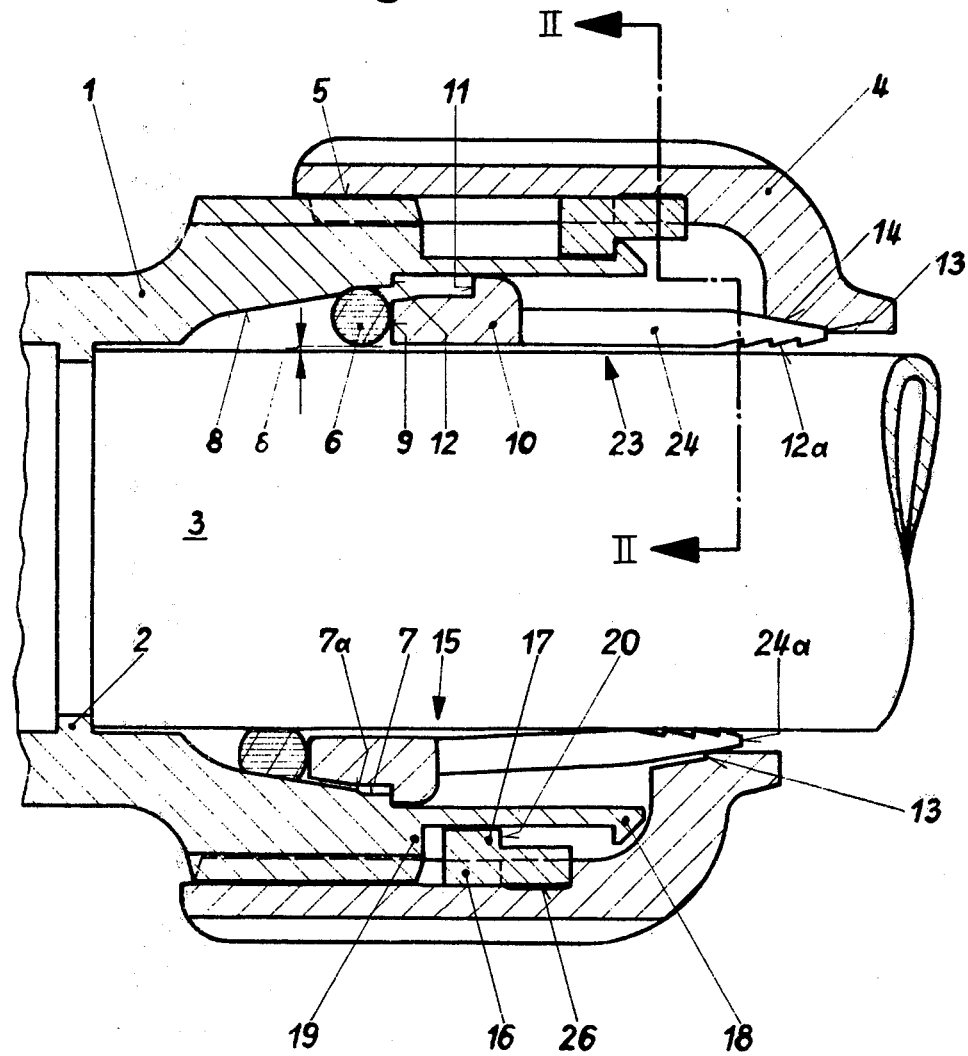
FIG. 1 is a side elevation in longitudinal section showing, in the upper half, one-half of a threaded coupling in the unstrained state and in the lower one-half, half of the threaded coupling in the strained state.

The smooth screwed pipe joint or threaded coupling in FIG. 1 is one-half of a connection for two pipes, the other (left-hand) half which receives the second pipe end being identical, and therefore not being shown. However, the invention can also be used, for example, for branch connections (T or cross connections) or for a one-sided screwed joint for the connection of a pipe end to a container, fitting or the like.

The smooth, screwed pipe joint according to FIG. 1 comprises a housing 1 with an annular shoulder 2 for a pipe end 3 and a sleeve nut 4. A one-part locking ring arrangement 15 comprises a thrust ring 10, a gripping member 23 and an elastomeric gasket 6 positioned behind the thrust ring 10 in housing 1.

Sleeve nut 4 is internally threaded and threadedly engages external threads on the housing 1 at 5. When the screwed joint is disengaged or unstressed (top of FIG. 1), the gasket 6 is located in the cylindrical portion 7 of a housing bore to which is connected, via a shoulder 7a, a conical member 8 which tapers towards the base of the housing. The gasket 6 can axially engage with the conical member 8 of the bore and with the back radial surface 9 of thrust ring 10. The gasket is dimensioned in such a way that there is a clearance between the external diameter of the pipe end 3 and the internal diameter of the gasket 6. It is therefore easy to insert the pipe end 3 without a one-sided twisting or compression of gasket 6, even in the case of a slightly oval pipe end 3. The thrust ring 10 also extensively protects the radially expanded gasket 6 against damage by the pipe end 3.

Figure 2:
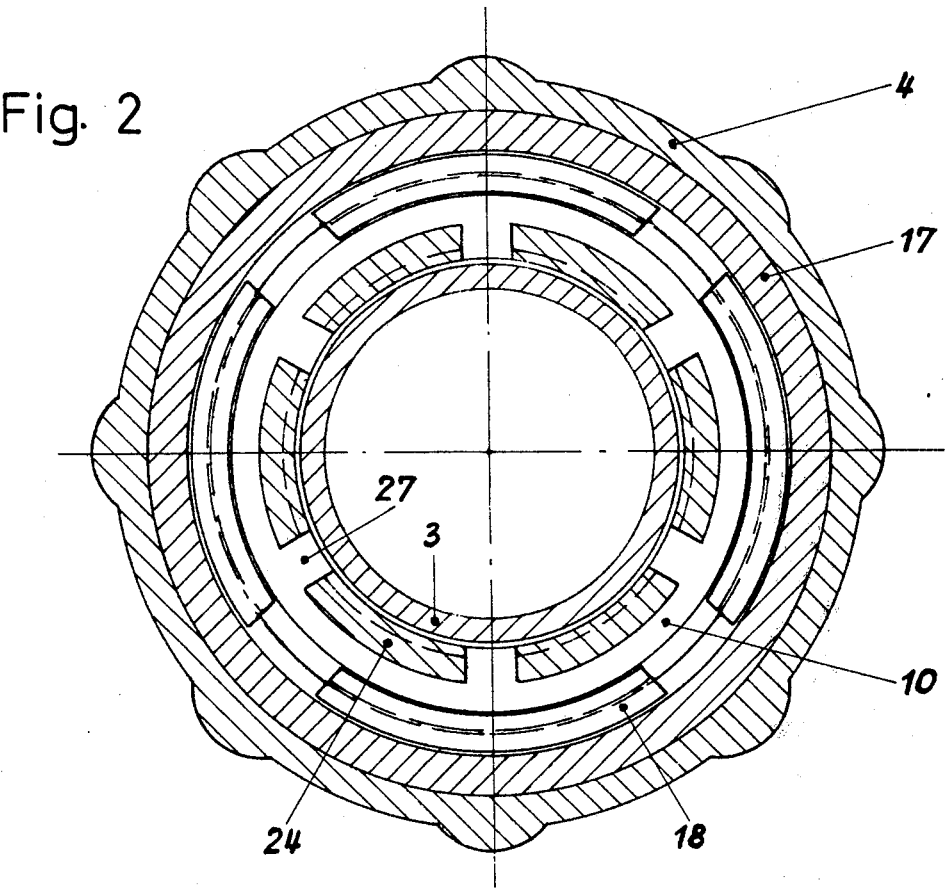
FIG. 2 is a vertical section along the line II—II of FIG. 1 in the unstrained state.

The gripping member 23 of the locking ring arrangement 15 peripherally has a plurality of longitudinal slots 27 (FIG. 2) which define a plurality of radially resilient tongues 24, the inwardly facing surfaces of which have a tooth system 12a with a sawtooth profile. The resilient tongues 24 are, in the embodiment shown, integrally formed with the thrust ring 10. The locking ring arrangement could also comprise a thrust ring and a gripping member separated therefrom, e.g., in the form of a once-slit resilient collet. The distal ends of the tongues 24 cooperate with a conical surface 14 of sleeve nut 4. In the vicinity thereof is provided an annularly extending shoulder or ridge 13, which in the unstressed state (top of FIG. 1) engages over the ends 24a of tongues 24 and thus forms a positive axial locking-in of locking ring arrangement 15. Such an axially acting positive locking-in connection between sleeve nut 4 and the locking ring arrangement 15 can also be provided at another point, e.g., in the form of an annular slot or rib positioned further back on the resilient tongues 24.

The thrust ring 10 has a shoulder constituting a stop face 11, which, in the stressed state (lower half of FIG. 1), engages against an inner shoulder 12 of housing 1.

Due to this limiting of the travel of thrust ring 10, the deformation and bearing pressure of gasket 6 are held within limits, which results in no creep of pipe end 3 or constriction of said pipe end. The dynamic self-sealing action of gasket 6 (i.e., the sealing principle of the O-ring) is maintained even in the case of a relatively slight initial stress.

In the half-coupling shown ready for assembly in sectional form in FIG. 1 (top half of the section), one of the pipe ends 3 to be connected can be easily inserted into the housing up to the shoulder 2 without any danger of damage, because the radial internal diameters of gasket 6, thrust ring 10 and gripping member 23 are correspondingly dimensioned.

After inserting pipe end 3 until it strikes against the shoulder 2, the sleeve nut is screwed against the housing 1. As a result of this screw motion, ledge 13 axially displaces the tongues 24 and thrust ring 10 against the gasket 6 and the latter is pressed by cylindrical member 7 into conical member 8. As a result of the axial movement the gasket 6 is radially squeezed in by conical surface 8 and engages sealingly about pipe end 3. The resistance exerted by gasket 6 against further insertion into conical member 8 increases until, through elastic deformation (bending or buckling), tongues 24 jump out of engagement with ledge 13, so that the positively locked-in connection is overcome. At the latest, this occurs when the thrust ring 10 with the stop face 11 strikes against the inner shoulder 12. As provided, the gasket 6 is then loaded and in its final sealing position (bottom of FIG. 1). Through further screwing down of sleeve nut 4, the conical surface 14 thereof presses onto the conical outer surfaces of the tongues 24 and with the progressive axial displacement between the sleeve nut 4 and the tongues 24, forces the tooth system 12a radially inwardly against the surface of pipe end 3. Thus, pipe end 3 is also held by the tongues 24 as in a collet chuck.

Due to the clear separation of the sealing function provided by gasket 6 and the securing function provided by tongue 24, it is ensured that there can be no overloading of gasket 6, whereby by means of a rotary movement, first the sealing and then the securing can be ensured. The construction of the parts and their material characteristics thus fix the maximum sealing force and the overcoming of the locking-in for starting the securing process.

A construction is also possible in which the housing 1 has a radial shoulder (not shown) in place of the conical member 8 behind the gasket 6. In this case, the gasket 6 can also have a clearance relative to the pipe end 3 in the unstressed state. Then, on screwing down the sleeve nut 4, it is increasingly laterally pressed between the said shoulder and the thrust ring 10 and is radially pressed against the pipe accompanied by cross-sectional deformation. Thus, this process takes place without a greater axial movement of the thrust ring 10, but with a free displaceability thereof relative to the pipe, until the locking-in between sleeve nut 4 and gripping member 23 is overcome and subsequently, upon further screwing down of the nut, gripping member 23 is deformed.

As shown, the sleeve nut 4 preferably has a hold-back ring 17 in the thread base 26, although said ring can also be cast in one piece in the sleeve nut 4. In the represented embodiments, the inwardly projecting hold-back ring 17 is provided with the thread 16, which coincides with nut thread 5.

The screwed-in hold-back ring 17 can also be secured in place by means of an adhesive. However, it can also be constructed as a spring ring inserted in a slot in the thread base 26.

According to FIG. 1, the hold-back ring 17 engages behind a plurality of hooks 18 on housing 1, which project beyond the housing end 19. On screwing down sleeve nut 4, as soon as the tooth system 12a of tongues 24 and the gasket 6 are free, the collar 20 of hold-back 17 engages on the hooks 18.

Thus, a disassembly of the screwed joint on loosening is prevented.

Thus, the complete screwed joint, including the left-hand half (not shown) remains a closed unit during assembly and disassembly, so that no components can become lost or can be displaced and removed with the pipe end. Furthermore, as a result, the components are better protected against dirt, incrustation and clogging, e.g., when laying on or in the ground. The complete screwed joint or coupling is, in this forced state of disassembly, immediately ready for reassembly as a unit. Through corresponding dimensioning and tolerances of the guidance system for gasket 6 and stop face 11 on thrust ring 10, sleeve nut 4, hooks 18 and hold-back ring 17, the initial position and readiness for assembly are immediately restored on screwing down the sleeve nut 4 and on removing the pipe end 3.

The above-mentioned measures make it possible to construct a tension-proof and reliably sealing smooth screwed pipe joint, which is easy to operate, of which no parts can be lost or interchanged or incorrectly fitted.

While certain advantageous embodiments have been chosen to illustrate the invention, it will be understood by those skilled in the art that various changes and modifications can be made therein without departing from the scope of the invention as defined in the appended claims.

What is claimed is:

1. A threaded coupling for smooth pipe comprising
    a housing member for receiving one pipe end;
    a sleeve nut threadedly engaging said housing, said nut having an inner conical surface,
        said nut being axially movable relative to said housing upon relative rotation thereof between a disengaged position and a fully engaged position;
    an elastomeric gasket within said housing;
    a thrust ring axially adjacent said gasket; and
    elastically deformable gripping means abutting said conical surface and said thrust ring for gripping said pipe;
    said sleeve nut and said thrust ring having cooperative surfaces to cause axial movement of said thrust ring during a first portion of the axial movement of said sleeve nut from said disengaged position toward said engaged position, said axial movement of said thrust ring causing an axial force on said gasket;
    said cooperative surfaces being disengaged at a predetermined axial force to subsequently permit radial deformation of said gripping means by said conical surface to grip said pipe.

2. A coupling according to claim 1 wherein said gripping means includes a plurality of axially extending radially resilient tongues separated by longitudinal slots;

and said cooperative surfaces include a shallow annular shoulder formed on said conical surface and the distal ends of said tongues.

3. A coupling according to claim 2 wherein said tongues are integrally formed with said thrust ring to form a locking ring system.

4. A coupling according to claim 1 wherein said housing member includes an axially facing annular shoulder; and said thrust ring includes an annular shoulder facing said shoulder on said housing, abutment of said shoulder being effective to limit axial movement of said ring.

5. A coupling according to claim 1 wherein said housing member includes an inner guide conical surface for said gasket, said gasket being axially displaceable between an expanded and a tapered position by said guide surface when axially moved by said thrust ring.

6. A coupling according to claim 1 wherein said housing includes an annular hook-like member, said coupling further including a collar attached to and movable with said sleeve nut, said collar being engagable with said hook-like member to prevent unintentional disassembly of said coupling.

* * * * *